United States Patent
Stueck

(10) Patent No.: US 11,521,027 B2
(45) Date of Patent: Dec. 6, 2022

(54) METHOD AND DEVICE FOR FUSION OF MEASUREMENTS FROM DIFFERENT INFORMATION SOURCES

(71) Applicant: Conti Temic microelectronic GmbH, Nuremberg (DE)

(72) Inventor: Robert Stueck, Lindau (DE)

(73) Assignee: CONTI TEMIC MICROELECTRONIC GMBH, Nuremberg (DE)

(*) Notice: Subject to any disclaimer, the term of this patent is extended or adjusted under 35 U.S.C. 154(b) by 212 days.

(21) Appl. No.: 16/770,713

(22) PCT Filed: Dec. 7, 2018

(86) PCT No.: PCT/DE2018/200111
§ 371 (c)(1),
(2) Date: Jun. 8, 2020

(87) PCT Pub. No.: WO2019/120392
PCT Pub. Date: Jun. 27, 2019

(65) Prior Publication Data
US 2021/0166087 A1    Jun. 3, 2021

(30) Foreign Application Priority Data
Dec. 20, 2017    (DE) .................. 10 2017 223 325.7

(51) Int. Cl.
*G06K 9/00* (2022.01)
*G06K 9/62* (2022.01)
(Continued)

(52) U.S. Cl.
CPC .............. *G06K 9/6289* (2013.01); *G06T 7/60* (2013.01); *G06T 7/70* (2017.01); *G06V 20/58* (2022.01); *G06T 2207/30261* (2013.01)

(58) Field of Classification Search
None
See application file for complete search history.

(56) References Cited

U.S. PATENT DOCUMENTS 7,719,461 B1 *   5/2010   Mookerjee .............. G01S 7/003
                                                          342/135
9,701,289 B2    7/2017   Zhang et al.
(Continued)

FOREIGN PATENT DOCUMENTS

DE   102009006113   9/2009
DE   102012023746   6/2014
(Continued)

OTHER PUBLICATIONS

English translation of the International Search Report of the International Searching Authority for International Application PCT/DE2018/200111, dated Mar. 15, 2019, 1 page, European Patent Office, HV Rijswijk, Netherlands.
(Continued)

*Primary Examiner* — Wei Wen Yang
(74) *Attorney, Agent, or Firm* — RatnerPrestia

(57) ABSTRACT

The invention relates to a method and a device for fusion of measurements from various information sources (I 1, I 2, . . . , I m) in conjunction with filtering of a filter vector, wherein the information sources (I 1, I 2, . . . , I m) comprise one or more environment detection sensor(s) of an ego vehicle,
  wherein in each case at least one measured quantity derived from the measurements is contained in the filter vector,
  wherein the measurements from at least one individual information source (I 1; I 2; . . . , I m) are mapped nonlinearly to the respective measured quantity, wherein at least one of these mapping operations depends on at least one indeterminate parameter,
(Continued)

wherein the value to be determined of the at least one indeterminate parameter is estimated from the measurements of the different information sources (I 1, I 2, . . . , I m) and wherein the filter vector is not needed for estimating the at least one indeterminate parameter.

12 Claims, 4 Drawing Sheets

(51) Int. Cl.
  *G06T 7/70* (2017.01)
  *G06T 7/60* (2017.01)
  *G06V 20/58* (2022.01)

(56) References Cited

U.S. PATENT DOCUMENTS

| | | | |
|---|---|---|---|
| 2008/0219508 | A1 | 9/2008 | Ganguli et al. |
| 2009/0125274 | A1 | 5/2009 | Waldock et al. |
| 2017/0345164 | A1* | 11/2017 | Guerreiro ............... G06T 7/80 |

FOREIGN PATENT DOCUMENTS

| | | |
|---|---|---|
| DE | 102013205245 | 9/2014 |
| DE | 102013213067 | 1/2015 |

OTHER PUBLICATIONS

PCT International Preliminary Report on Patentability including English Translation of PCT Written Opinion of the International Searching Authority for International Application PCT/DE2018/200111, dated Jun. 23, 2020, 8 pages, International Bureau of WIPO, Geneva, Switzerland.

German Search Report for German Patent Application No. 10 2017 223 325.7, dated Jun. 12, 2018, 10 pages, German Patent and Trademark Office, Muenchen, Germany, with partial English translation, 6 pages.

Haryong Song et al., "Target Localization Using RGB-D Camera and LiDAR Sensor Fusion for Relative Navigation", Proceedings of CACS 2014 International Automatic Control Conference, Nov. 26-28, 2014, ISBN: 978-1-4799-4584-9, XP055565918, pp. 144 to 149 (republished at researchgate.net, publication/282173648, pp. 31 to 36).

X. Lin et al., "Exact Multisensor Dynamic Bias Estimation with Local Tracks", Proceedings of the Sixth International Conference of Information Fusing, Jan. 1, 2003, ISBN: 978-0-9721844-4-1, XP055565242, pp. 159 to 167.

Shuo Zhang et al. , "Tracking with Multisensor Out-Of-Sequence Measurements with Residual Biases", Journal of Advances in Information Fusion, vol. 6, No. 1, Jun. 2011, pp. 3 to 23.

Ehsan Taghavi et al., "A Practical Bias Estimation Algorithm for Mulitsensor-Multitarget Tracking", IEEE Transactions on Aerospace and Electronics Systems Jun. 2015, retrieved on Dec. 13, 2017 at https://arxiv.org/pdf/1603.03449.

Eric Wan, "Dual Kalman Filtering Methods for Nonlinear Prediction, Smoothing, and Estimation", Advances in Neural Information Processing Systems, 1997, pp. 793 to 799.

Y. Bar-Shalom et al., "Multisensor Dynamic Bias Estimation with Local Tracks" from the book "Tracking and Data Fusion—a Handbook of Algorithms", YBS Publishing, 2011, ISBN : 978-0964-8312-78, Sections 16.3.1 to 16.3.3.

* cited by examiner

METHOD AND DEVICE FOR FUSION OF MEASUREMENTS FROM DIFFERENT INFORMATION SOURCES

The invention relates to a method and a device for fusion of measurements from different information sources and may in particular be used in driver assistance systems or vehicle control systems of self-driving vehicles for fusion of environment sensor data.

DE 10 2009 006 113 A1 discloses sensor fusion with dynamic objects, in which sensor-specific objects to which an existence probability is assigned are generated from the measurements prior to fusion. In addition, a common occupancy grid map is drawn up, in which the measurements from the individual sensors are fused into a probability of the occupancy of a grid cell. A stereo camera and a radar sensor are indicated as examples of sensors.

DE 10 2013 205 245 A1 discloses a vehicle reference velocity determination method. Vehicle dynamics (velocity, acceleration) are estimated on the basis of measurements of speed of tire rotation, engine and braking torques and acceleration sensors. To this end, coefficients of friction and wheel slip are inter alia also estimated.

The fusion of a plurality of sensors for tracking objects is a much-discussed problem. In particular, a multiplicity of publications relate to the combination of multiple radar sensors with estimation of the relative positions of the sensors. As a rule, publications on this subject are limited to the modeling of sensor offset by means of unknown parameters requiring determination, which are additively associated with state quantities. Thus, for example, the unknown position of a radar sensor is described as an unknown additive offset relative to the position of the tracked object.

It is an object of the invention to provide a solution as to how measurements from different information sources can be meaningfully and reliably fused taking account of at least one unknown parameter.

The following considerations constitute a starting point for achieving this solution:

In the case of a poor estimate of unknown parameters, information is not optimally processed, which translates into low precision as regards filter state. In particular, the kinematics and position of the tracked object may be disrupted. The robustness of the object kinematics in the event of failure of individual information sources may also be significantly reduced.

In general, the sensor parameters to be determined may be included nonlinearly in the measurement equations and thus cannot be described (or only poorly, since they are not constant) as additive parameters relating to object state.

Even more generally, the parameters of the information sources used (a more appropriate term might be "cues") may be derived from measurements of at least one sensor. In particular, multiple information sources may be derived from a sensor's measurements, for example by different evaluation methods of the sensor measurement data. For example, the distance of objects may be determined from the classifier detections of a stereo camera by means of the disparity, the width/height in the image and the lower edge or by means of structure-from-motion-based information.

Standard methods for linking unknown parameters included nonlinearly in the filtering are based on an extension of the filter state with the unknown parameters.

Examples are disclosed in the following publications:

*Tracking with Multisensor Out-of-Sequence Measurements with Residual Biases*, Shuo Zhang et al., JOURNAL OF ADVANCES IN INFORMATION FUSION Vol. 6, No. 1, June 2011, pp. 3-23.

*A Practical Bias Estimation Algorithm for Multisensor-Multitarget Tracking*, Ehsan Taghavi et al. IEEE Transactions on Aerospace and Electronics system 2016, retrieved on Dec. 13, 2017 at https://arxiv.org/pdf/1603.03449

*Dual Kalman Filtering Methods for Nonlinear Prediction, Smoothing, and Estimation*, Wan, Nelson Advances in neural information processing systems, 1997, pp. 793-799.

Sections 16.3.1 to 16.3.3 (*Multisensor Dynamic Bias Estimation with Local Tracks*) from the book: *Tracking and Data Fusion—A Handbook of Algorithms*, Bar-Shalom et al., YBS Publishing, 2011, ISBN: 978-0964-8312-78.

Extension of the filter state by the unknown parameters generally leads to underdetermination of the estimation problem. This results on the one hand in the response time of the filter being lengthened and on the other hand in the filter becoming more sluggish, since part of the innovation always flows away into the parameters. In particular, if the underlying model is significantly violated (e.g. if a vehicle traveling in front at a constant velocity brakes suddenly, wherein an acceleration of 0 is assumed in the filter), innovation will flow away into the additional parameters. This on the one hand slows down adaptation of the model (e.g. of acceleration to the value of the braking vehicle) and on the other hand disrupts the learned additional parameters.

One aspect of the invention consists in associating the tracking of objects with the estimation of parameters included nonlinearly in the measurement equations, without extending the filter state.

A further aspect relates to a further development of a Kalman filter for camera-based object tracking. In particular, multiple information sources (disparity, width/height, lower edge) are used here for robust tracking of individual objects.

One approach to solving the problem consists in relating measurements from different information sources to one another by way of parameter-dependent measurement equations. The unknown parameters can thus be estimated directly from the measurements and do not have to be estimated against the filtered object state. In camera-based object tracking, the above-stated relationship is often independent of the object state. This allows optimum estimation of the unknown parameters from the given measurements with a corresponding estimation method.

If more generally the information sources are interrelated as a function of the object state, the parameter estimation problem can be extended in such a way that estimation of all parameters can be achieved by violation of the constancy assumption of some parameters which are to be estimated.

The process steps performed in one time step for a filter for object tracking are:
1) prediction of the filter state
2) updating of the filter state with the given measurements
3) updating of the parameter estimation with the given measurements (without using the filter state)

Advantages:

Estimating the free parameters in the measurement equations results in the following advantages over a system without parameter estimation:
1) More robust object tracking
2) More precise object tracking
3) Artifact-free object tracking (relative to the artifacts arising through the use of incorrect parameters)

A method according to the invention for fusion of measurements from different information sources (comprising one or more environment detection sensor (s) of an ego vehicle) in conjunction with filtering of a filter vector provides that in each case at least one measured quantity derived from the measurements is contained in the filter vector, the measurements of at least one individual information source are nonlinearly mapped onto the respective measured quantity, wherein at least one of these mapping operations depends on at least one indeterminate parameter, the value to be determined of the at least one indeterminate parameter is estimated from the measurements of the various information sources and the filter vector is not needed for estimating the at least one indeterminate parameter.

The latter statement means that filtering of the filter vector and estimation of the parameter(s) are performed "mutually independently". In other words, the at least one indeterminate parameter is estimated in parallel with filtering of the filter vector.

Preferably, filtering of the filter vector is temporal filtering, for example using a Kalman filter.

The following steps are preferably carried out in one time step of the filtering:

prediction of the filter vector updating of the filter vector by new measurements, and updating of the estimation of the at least one indeterminate parameter by the new measurements.

In the third of said steps, the filter vector is preferably not used to update the estimate of the at least one indeterminate parameter.

The measured quantities are preferably derived using different measuring or evaluation methods of an environment detection sensor, in particular a forward-facing vehicle camera.

Alternatively or cumulatively, the measured quantities are derived from measurements from different environment detection sensors or different environment detection sensor types as information sources.

One of the measurements, which is determined by means of a reference measurement method (as information source), preferably supplies a reference measured quantity, which is not dependent on a first unknown parameter, on which, however, at least one measured quantity from another measurement is dependent.

The reference measurement method may preferably be dependent on a second independent parameter, wherein a parameter value is predetermined for the second independent parameter. It is for example the case that the second parameter for an object is constant over time (for example fixed vehicle width). The second parameter may advantageously be meaningfully delimited (width of any desired vehicle or height above the carriageway plane of any desired vehicle). An average parameter value may be predetermined for the second parameter. The first parameter may be estimated on the basis of the predetermined second parameter. An error in the predetermined second parameter relative to the actual value of this parameter may have different effects. The effects are dependent on the measurement equation. In the case of camera-based object tracking, an incorrect width assumption is not serious since, although it leads to incorrect distance estimates, this is with consistently incorrect velocities, such that the quotient of the two, from which a braking time is derived, is not disturbed.

The method is preferably used for object tracking.

The quantity derived from the measurements is preferably the distance between the ego vehicle and an object vehicle.

A first information source may consist in a first evaluation of an image from a vehicle camera of the ego vehicle supplying, by way of determination of the width of the object vehicle in the image from the vehicle camera, assuming a predetermined average width for vehicles as the corresponding width of the object vehicle, a first measured quantity for the distance between ego and object vehicles. A first indeterminate parameter may be the actual width of the object vehicle. The filter vector may contain further quantities, such as for example the relative velocity of the two vehicles.

In a preferred further development, a second information source consists in a second evaluation of the image from the vehicle camera of the ego vehicle supplying, by way of measurement of the vertical position of the vehicle lower edge in the image of the vehicle camera, a second measured quantity of the distance between ego and object vehicles. A second indeterminate parameter is the true height of the camera above the carriageway plane (below the object vehicle). The position of the carriageway plane in the case of the object vehicle is preferably defined by the bottom of an object bounding box, or described by the position of the lower edge of the object vehicle in the image from the vehicle camera.

Advantageously, a reference measured quantity for the distance is provided from a disparity measurement or by a radar or lidar sensor of the ego vehicle as information source.

The invention further relates to a device which is configured for fusion of measurements from various information sources in conjunction with filtering of a filter vector.

The measurements relate to the same information to be determined and the filter vector in each case contains at least one measured quantity derived from the respective measurement in relation to the information to be determined.

The measurements from at least one individual information source are mapped nonlinearly to the respective measured quantity and at least one of these mapping operations depends on at least one indeterminate parameter. A model exists, for example, for the influence of the parameter on the measured quantity and the parameter is included nonlinearly in the measured quantity. The filter vector may in particular describe a state. The result of filtering in particular yields the fusion result for the state. In other words, the filtering corresponds to an estimation method.

The value to be determined of the at least one indeterminate parameter is estimated from the measurements from the various information sources.

The filter vector is not needed for estimating the at least one indeterminate parameter. In other words, the at least one indeterminate parameter is estimated in that the measured quantities from the different information sources are related to one another.

The device may in particular comprise a microcontroller or processor, a digital signal processor (DSP), an ASIC (Application Specific Integrated Circuit), an FPGA (Field Programmable Gate Array) and the like as well as software for carrying out the corresponding method steps.

The present invention may thus be implemented in digital electronic circuits, computer hardware, firmware or software.

A mathematical formulation of the problem addressed and the approach taken to solve it is firstly presented below. A solution and the implementation thereof for a specific exemplary embodiment are then described.

Mathematical Prerequisites

Let $x \in \mathbb{R}^d$ be a filter vector, which is measured sequentially using M different types of measurement method. The interrelationship between measurement and state vector is given via parameter-dependent bijective mapping operations of a subspace $V_m$ of the state space into the respective measurement space For simplicity's sake, identical definition ranges are assumed hereinafter for the measurement mapping operations $V_m \equiv V$, $m=1 \ldots M$. Generalization to measurement mapping operations with nonidentical definition ranges can be directly derived, providing at least two measurement spaces can be mapped onto one another via the measurement mapping operations.

The interrelationship between the exact filter vector $x^\dagger$ and parameter $p^\dagger$ quantities and measured value quantity $z^\dagger$ is described by the nonlinear measurement mapping operations wherein $\mathcal{P}_V$ denotes the orthogonal projector onto the subspace V. For clarity's sake, it is assumed below that $V= \mathbb{R}^d$ and thus $\mathcal{P}_V x = x$. $z := (z_1, \ldots, z_m)^T$ denotes the measurement vector and $p := (p_1, \ldots, p_m)^T$ the corresponding parameter vector.

Mathematical Problem

For M different measurement methods at the point in time $t \geq 1$ a set of measurements $\{z_m^t\}_{m=1 \ldots M}$ with measurement mapping operations 1 is given. The problem to be solved, in the event that it is unambiguously solvable, may be stated as Find estimates $\hat{x}_t$, $\hat{p}_t$ for $x_t^\dagger$, $p_t^\dagger$ initially (t=1) and subsequently update these values (t>1), such that $\hat{x}_t \approx x_t^\dagger$ or $\hat{p}_t \approx p_t^\dagger$.

If the filter correctly describes the measurement distributions and also correctly models the system to be measured, "≈" can be understood as an unbiased estimate with regard to the distribution estimated at $\hat{x}_t$, i.e. $E_{\hat{x}_t}(\hat{x}_t) = x_t^\dagger$.

It may occur, for example in camera-based object tracking, that the problem of finding estimates $\hat{x}_t$, $\hat{p}_t$ for $x_t^\dagger$, $p_t^\dagger$ is underdetermined, such that an approximation to the underlying quantities $x_t$, $p_t$ cannot be sought. In this case, the problem to be solved can be stated as Estimate the associated filter and parameter vector $\hat{x}_t$, $\hat{p}_t$ initially (t=1) and subsequently update these quantities (t>1), such that quantities of interest can be derived as precisely as possible from the estimated filter vector.

For camera-based object tracking in the automotive sector, a quantity of interest is for example the time to collision (TTC), which is given for objects on a collision course as the quotient of distance and longitudinal relative velocity. For practical application in the vehicle control unit, a short filter response time and latency, and derived quantities which are artifact-free are of particular interest.

Mathematical Solution

The idea behind the method is then directly to estimate the unknown parameters $p_m$ independently of the filter vector by relating the various measurements to one another. To this end, the measurements may for example be mapped to one another in pairs:

for $k,m=1$

In this procedure, it is not essential to evaluate all the pairs, but rather a reference measurement may be defined, the parameter of which is assumed to be known and in relation to which all the other parameters are estimated. The reference measurement parameter is initially estimated from the set of given measurements using parameter vector assumptions.

A more robust procedure for parameter determination would for example be minimization of a functional, such as according to p and $\tilde{x}$. If $p^\dagger$ and $\tilde{x}^\dagger$ are the minimizers of $J_\lambda^t(p, \tilde{x})$, then $\tilde{x}^\dagger$ is a filter vector-independent estimate of the filter vector solely from data from a single point in time.

Using the filter vector instead and only minimizing according to the parameter vector would disrupt parameter estimation if the pattern mapped in the filter is violated and would so increase filter latency. Parallel estimation of a parameter vector and temporal filtering of a state vector may be understood as a generalization or extension of the method described in section 16.3.3 "The Ideal Dynamic Bias Estimator" of the handbook by Bar-Shalom. The method presented therein is restricted to the parallel estimation of parameters which are coupled linearly to a Kalman filter vector. The method described herein generalizes this to parameters included nonlinearly in measurement equations. Moreover, the method presented herein may also be used if the problem of estimating a filter and a parameter vector is underdetermined, as is the case with mono camera-based object tracking.

Exemplary Embodiment: Camera-Based Object Tracking

In camera-based object tracking, measurements are typically given as classifier detections. These detections are for example bounding boxes, i.e. rectangular image areas which describe the position and size of a detected object. The object-describing state $x=(x, y, v_x, v_y, a_x, a_y)^T$, which is filtered over time, contains the horizontal components of position (x, y), velocity ($v_x$, $v_y$) and acceleration ($a_x$, $a_y$). Assuming that the road extends flat, the camera is oriented parallel to the road and the lower edge of the bounding box describes that part of the object which is situated on the road, the distance may be determined from the lower edge measurement by way of an intercept theorem equation Here $t_z$ is the height of the camera above the road, f the focal length of the camera, $p_{y,m}$ the measured vertical position of the lower edge and $c_y$ the vertical image center, which is the image line, which in a flat world corresponds to the horizon.

A second way of deriving a distance from a rectangle in the image is to make an assumption about the size of the observed object. If the observed object for example describes an automobile, on the basis of the assumption that the rear of an automobile traveling in front in the same direction is seen and that in Germany this will conventionally have a width of around $b_w := 1.75$ m, a distance can be derived from the width of the rectangle in the image which describes the automobile:

wherein $\Delta p_{x,m}$ denotes the measured image width.

Now, not all automobiles have the same width, the road is not exactly flat, objects are not always on the road and the classifier detection does not always describe that part of an object which is situated on the road. Therefore, the distance which is determined using the above-stated measurement mapping operations according to equations 4 and 5 will in general not match. That is to say, in general the following apply and also $$\frac{t_z f}{\left|E_{\hat{p}_{y,m}}(\tilde{p}_{y,m}) - c_y\right|} \neq \frac{b_w f}{E_{\tilde{\Delta} p_{x,m}}(\tilde{\Delta} p_{x,m})}. \quad (7)$$

The model errors may be described by unknown parameters; for instance, the true width of the detected object is given as for example $b_w^\dagger := p_w^\dagger b_w$ and the true height of the camera above the point which is described by the lower edge of the box is given as for example $t_z^\dagger := t_z + p_t^\dagger$. The values of $p_w^\dagger$ and $p_t^\dagger$ are in general unknown and must be estimated, i.e. from neither of the two measurements (and not even in combination) can the exact distance of the observed object be derived—the position of the object is only known with the exception of one parameter error. The fact that both measurements describe the same object, however, constrains the permitted parameters. If, for example, one parameter is assumed as given, a value is obtained for the second parameter by equating as in equation 2, irrespective of the actual filter state. Starting from equations 4 and 5, the measurement mapping operations with parameters are defined as Since the width of an automobile is constant, the parameter $p_b$ is an object constant. If the camera orientation relative to the road and the course of the road are assumed to be known, $p_t$ is also an object/classifier constant, which describes the offset relative to the plane of the road of the structure found by the classifier which is described by the lower edge of the box. If equations 8 and 9 are linked as indicated in equation 2, the interrelationship between the measurements $p_{y,m}$, $\Delta p_{x,m}$ and the parameters $p_t$, $p_b$ is obtained, from which the parameters may be estimated as described above.

To illustrate the mathematical formulation of this exemplary embodiment and further aspects of method and device, individual interrelationships are explained in greater detail below with reference to figures.

Therein:

Figure 1:
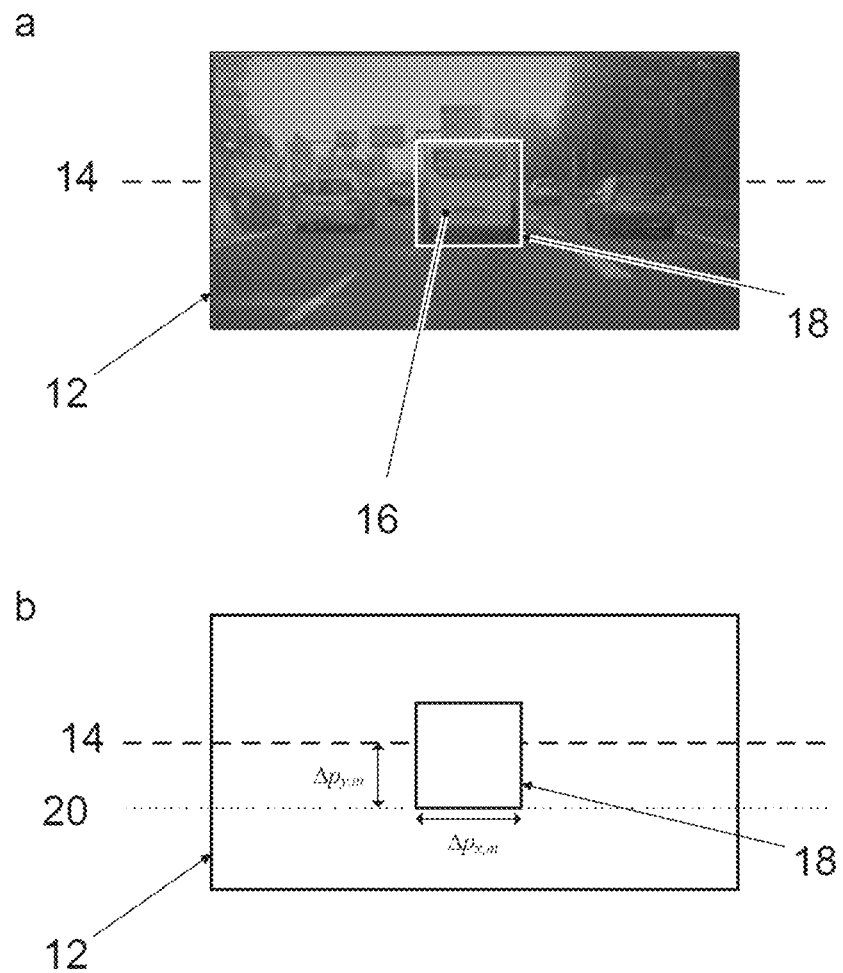
FIG. 1a shows object recognition in a vehicle camera image.
FIG. 1b shows the determination of relevant image quantities for estimating the distance between the vehicle camera and a detected object.

FIG. 1a schematically shows a black and white image 12 which was captured by a monocular front camera of an ego vehicle (not shown). The digital image 12 is fed to an image processing unit, which in particular performs recognition of vehicles as objects in the image 12. This recognition comprises a classifier, which assigns objects in the image to classes on the basis of previously learned examples. In this way, the central object 16 in the image 12 is recognized as a vehicle traveling in front. The boundary of the object or vehicle 16 in the image 12 is symbolized by a bounding box 18. The image processing unit additionally determines the vertical image position of the horizon line 14 in the image 12.

The schematic representation of FIG. 1b shows the image processing results: the image 12 is represented by the rectangular frame, the horizon line 14 as a dashed line, and the bounding box 18 as an approximately square rectangle. The width $\Delta p_{x,m}$ of the bounding box 18 (horizontal double-headed arrow) corresponds to the width of the vehicle 16 in the image 12. The vertical position of the lower edge (bottom line 20) of the bounding box 18 is shown as a dotted line. The vertical image distance $\Delta p_{y,m} := |p_{y,m} - c_y|$ (see equation 4) between horizon 14 and bottom line 20 is illustrated by the vertical double-headed arrow.

Figure 2:
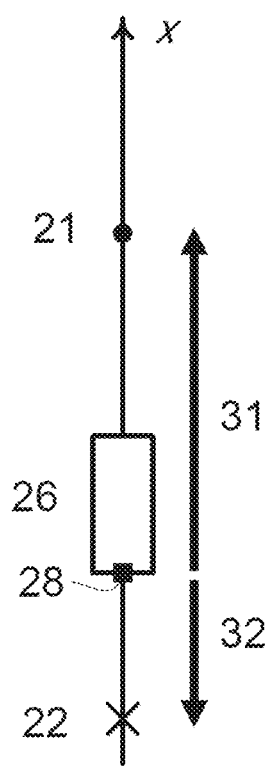
FIG. 2 is a schematic representation of a filter update for object tracking without parameter estimation.

FIG. 2 is a schematic representation of a situation in which an object 26, represented as a rectangle, is located at a determined x position 28. The object 26 is for example a vehicle. The ego vehicle, in which a forward-facing mono camera is installed, is not shown in FIG. 2. The object vehicle 26 is, however, detectable using image processing methods from images captured by the mono camera of the ego vehicle. The position of the object vehicle 26 or the distance in the x-direction between the object vehicle 26 and the ego vehicle may, as previously described, be determined or measured using two image processing methods.

To increase accuracy, the measured values resulting from the two image processing methods are temporally filtered using a Kalman filter.

From the measurements of the distance x by way of determination of the width $\Delta p_{x,m}$ of the vehicle object 26 in the image 12, assuming an average vehicle width of 1.75 m, the lower operating point 22 is obtained as current estimated value of the position determination or distance measurement. The distance measured in this way is dependent on the actual width of the vehicle as an unknown parameter. The object vehicle 26 could be a narrow vehicle with an actual width of 1.50 m, for example, or a transporter with an actual width of at least 2 m.

The measurements of distance from the determination of the height of the lower edge of the object vehicle in the image 12 produce, as current estimated value of the distance measurement, the upper operating point 21. This measurement is not dependent on the actual width of the object vehicle 26 but on other conditions, such that here too measurement uncertainty is present with regard to the actual distance x.

The two different evaluation methods for the camera images thus represent two different information sources (I 1, I 2) in relation to the same quantity of interest (position or distance in the x-direction).

In a filter method, for example using a Kalman filter, the change in the estimated position is predicted for a next measurement and then the predicted position updated on the basis of the next measured value, a process known as filter innovation.

The position value of the filter vector, i.e. the current estimated value for the actual distance in the x direction, is represented by the square 28 in FIG. 2. The filter vector is the result of the temporal filtering of the two measured values, leading to the operating points 21 and 22.

Since the measured values of the two measurement methods lie respectively below and above the current estimated value (filter vector) 28, the innovation 32 of the first measurement method likewise points downwards and the innovation 31 of the second measurement method upwards. The expected value of the respective filter innovation 31 or 32 respectively is not equal to zero. For the new estimated value, however, the two innovations 31 and 32 largely cancel one another out.

In the case of the filter update represented in FIG. 2, unknown parameters, for example the width of the vehicle object 26, are not estimated or otherwise taken into account.

The object 26, whose actual position 28 is situated between the two operating points 21 and 22, is stably tracked, providing the respective innovations 31 and 32 cancel one another out. However, if one information source (I 1 or I 2) fails, no mutual cancellation is then able to take place. The estimated kinematics and position 28 of the object 26 are disrupted by the failure of the information source (I 1 or I 2). If a measured value fails at one point in time, for example because the lower edge of the object vehicle 26 cannot be located in the image 12, the filter vector will jump on the next filter update. The estimated distance in the x direction changes abruptly, which leads to an incorrect velocity estimate for the object vehicle 26 in the x direction. This can sometimes lead to an incorrect collision warning or even an incorrect automatic braking intervention by the ego vehicle.

Figure 3:
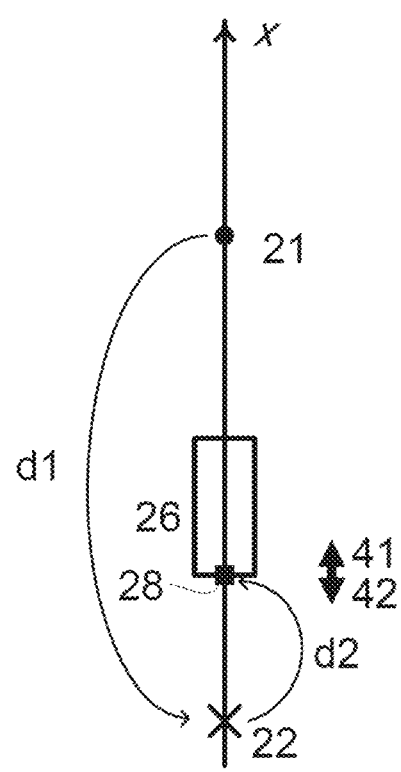
FIG. 3 is a schematic representation of a filter update for object tracking with parameter estimation.

FIG. 3 is a schematic representation of a filter update for object tracking with an estimate of an unknown parameter.

The lower operating point 22 here serves as reference value for measuring the upper operating point 21. The measurement which leads to the lower operating point 22 is not dependent on the unknown parameter. One example of such a reference measurement is, for example, the distance measurement from a radar sensor of the ego vehicle. For this measurement method, the width of the object vehicle 26 is of no relevance. The width cannot be determined by the reference measurement with the radar sensor. Since the measurement of the radar sensor does not produce the distance between the camera of the ego vehicle and the object vehicle 26, since there is a spatial offset between the radar and camera sensors in the ego vehicle, the lower operating point 22 is mapped to the filter vector 28 by a mapping operation d2. Since the spatial offset is constant over time and identifiable, this mapping operation d2 is independent of estimation of the width of the object vehicle 26.

How the upper operating point 21 can be mapped to the lower operating point 22 by a further mapping operation d1 is unknown, however, as the actual width of the object vehicle 26 plays apart here. Said width is unknown, however. To estimate the actual vehicle width, the average width of 1.75 m is initially assumed. Equation 5 describes the interrelationship between measured image width and distance x. Equation 9 indicates the measurement mapping with the parameter $p_b$. Since the value from the reference measurement plus the relevant sensor offset is assumed to be the actual distance x, the parameter may then be estimated directly from the measurement results in the context of the filter method. The operating points of the information sources I 1 and I 2 are mapped by way of the estimated parameters to one another or to the object position 28.

The expected value of the innovations 41 and 42 is then zero. In particular on failure of an information source (I 1 or I 2), the position and kinematics of the object are not disrupted, as is the case in FIG. 2.

If no radar sensor is provided, but rather the two evaluations of the camera data are performed as information sources I 1 and I 2, the two measurement results or operating points are dependent on different parameters (see equations 4 and 5 or 8 and 9).

In this case too, the parameters may be estimated.

Figure 4:
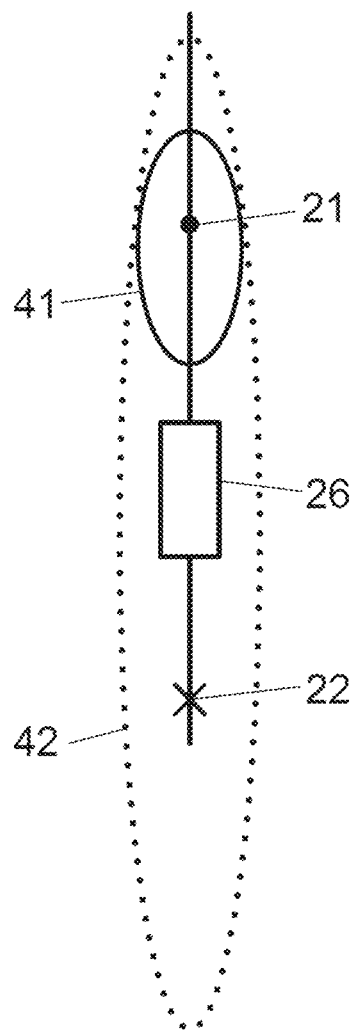
FIG. 4 shows an observed object together with operating points of two information sources and the position uncertainty of the operating points.

FIG. 4 shows an observed object 26 together with the operating points 21 and 22 of two information sources I 1 and I 2. The ellipses 41 and 42 around the operating points 21 and 22 schematically represent the position uncertainty of the operating points due to the uncertainty of the parameters in the measurement equations. The position uncertainty 42 (dotted ellipse) is very great in the case of the lower operating point 22, this position uncertainty 42 including the uncertainty due to the unknown parameter. The position uncertainty 41 (ellipse with continuous line) at the upper operating point 21 is not so great.

Figure 5:
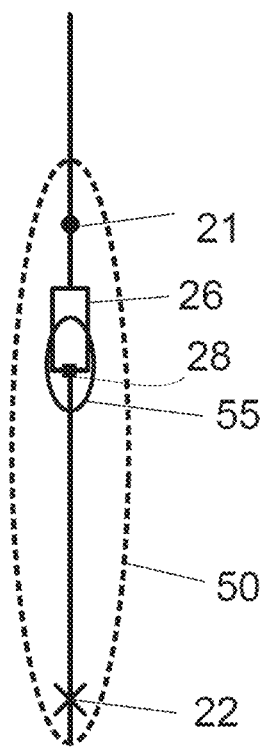
FIG. 5 shows an observed object together with an estimated object position, the filter-related position uncertainty and the parameter-based position uncertainty.

FIG. 5 is a schematic representation of an estimated position 28 of an object 26 together with the filter-related position uncertainty 55 (ellipse with continuous line) and position uncertainty due to the parameters 50 (dashed ellipse). Separation of the filter uncertainty from the parameter uncertainty enables comparatively sharp derivation of parameter-independent quantities from the filter state.

In camera-based object tracking it is, for example, possible to derive the time-to-collision (TTC) sharply from an object state with incorrect position and corresponding incorrect velocity. The known uncertainties from the parameter estimation can be used to calculate position uncertainty.

A further example of application is a common object tracking procedure with various sensors such as for example radar, camera or lidar. The parameters to be estimated here include the precise time and optionally spatial offset of the sensors relative to one another and the above-stated free parameters in camera-based distance determination.

Figure 6:
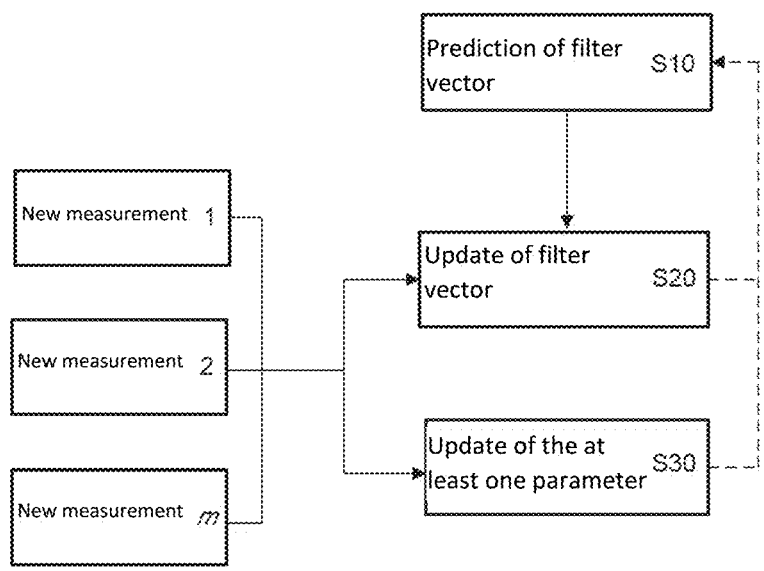
FIG. 6 is a schematic representation of the course of a filtering iteration step.

FIG. 6 is a schematic representation of the course of a filtering iteration step.

In step S10, the filter vector for the current iteration step, in which at least one new measurement takes place, is predicted on the basis of the previous filter vector and the previous parameter value(s). At least one information source supplies a new measurement 1; as a rule, a plurality or all of the available information sources supply new measurements 2 to m. On the basis of the current results of these measurements, the filter vector on the one hand is updated in step S20 and on the other the parameter(s) is/are updated in step S30. The latter is carried out independently of the filter vector, since the update of the at least one parameter only proceeds on the basis of the new measurements 1 optionally to m. The update of the parameter(s) in step S30 may thus proceed in parallel or in series with step S20. The parameter (s) updated by the update and the updated filter vector form the starting point for the next iteration step (shown symbolically by the dashed arrows in FIG. 6), in which at least one new measurement again takes place.

Figure 7:
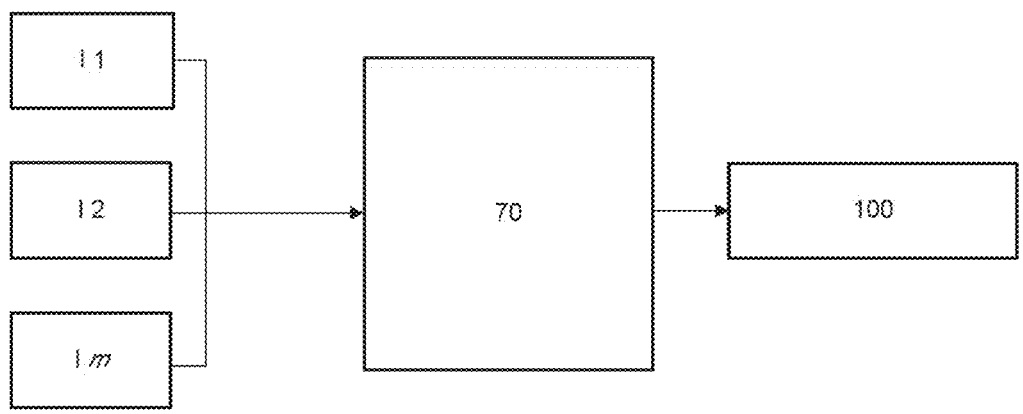
FIG. 7 is a schematic representation of a fusion device, which receives results of measurements from different information sources and outputs a fusion result.

FIG. 7 is a highly simplified representation of a fusion device 70, which receives data relating to measurements from multiple information sources I 1 to I m. The received data are processed by a processing unit of the fusion device in such a way that a filter vector and at least one unknown parameter, which influences a measurement of at least one information source, are iteratively estimated. Parts of the filter vector or the entire filter vector is/are output by an output component of the fusion device to a further component 100 of a driver assistance system or vehicle control system, in particular of a self-driving vehicle.

The invention claimed is:
1. A method for fusion of measurements from various information sources in conjunction with filtering of a filter vector indicating a distance from an ego vehicle to an object vehicle, wherein the information sources comprise one or more environment detection sensors of the ego vehicle, the method comprising:
   determining a first distance from the ego vehicle to the object vehicle from the measurements of at least one of the various information sources;
   determining a second distance from the ego vehicle to the object vehicle from the measurements of at least another one of the various information sources;
   using the first distance and the second distance to produce the filter vector indicating changes in the first distance and second distance over time;

mapping the measurements from the information sources nonlinearly to the filter vector, wherein the mapping of the measurements depends on at least one indeterminate parameter that is based on a physical parameter of the object vehicle; and estimating the at least one indeterminate parameter from a relationship between the measurements of the different information sources, wherein the estimation is performed independent of the filter vector.

2. The method according to claim 1, wherein the method is used for tracking an object in the environment of the ego vehicle.

3. The method according to claim 2, wherein the quantity derived from the measurements is the distance between the ego vehicle and an object vehicle, wherein a first information source consists in a first evaluation of an image from a vehicle camera of the ego vehicle supplying, by way of determination of the width of the object vehicle in the image from the vehicle camera, assuming a predetermined average width for vehicles as the corresponding width of the object vehicle, a first measured quantity for the distance between ego and object vehicles, wherein a first indeterminate parameter is the actual width of the object vehicle.

4. The method according to claim 3, wherein a second information source consists in a second evaluation of the image from the vehicle camera of the ego vehicle supplying, by way of measurement of the vertical position of the vehicle lower edge of the object vehicle in the image from the vehicle camera, a second measured quantity for the distance between ego and object vehicles, wherein a second indeterminate parameter is the true height of the camera above the carriageway plane.

5. The method according to claim 1, wherein the filtering of the filter vector is temporal filtering.

6. The method according to claim 5, wherein the following steps are carried out in one time step of the filtering:
prediction of the filter vector,
updating of the filter vector by at least one new measurement, and
updating of the estimate of the at least one indeterminate parameter by the at least one new measurement.

7. The method according to claim 6, wherein in the third step the filter vector is not used to update the estimate of the at least one indeterminate parameter.

8. The method according to claim 1, wherein the measured quantities are derived using different measuring or evaluation methods of an environment detection sensor.

9. The method according to claim 1, wherein the measured quantities are derived from measurements from different environment detection sensors or different environment detection sensor types as information sources.

10. The method according to claim 1, wherein one of the measurements, which is determined by means of a reference measurement method, supplies a reference measured quantity, which is not dependent on a first unknown parameter, on which at least one measured quantity from another measurement is dependent.

11. The method according to claim 10, wherein the reference measurement method is dependent on a second independent parameter, wherein a parameter value is predetermined for the second independent parameter.

12. A device, which is configured for fusion of measurements from different information sources in conjunction with filtering of a filter vector indicating a distance from an ego vehicle to an object vehicle, wherein the information sources comprise one or more environment detection sensors of the ego vehicle, the device comprising:
a processor configured to:
determine a first distance from the ego vehicle to the object vehicle from the measurements of at least one of the various information sources in relation to the information to be determined,
determine a second distance from the ego vehicle to the object vehicle from the measurements of at least another one of the various information sources,
use the first distance and the second distance to produce the filter vector indicating changes in the first distance and second distance over time,
map the measurements from the information sources nonlinearly to the filter vector, wherein the map of measurements depends on at least one indeterminate parameter that is based on a physical parameter of the object vehicle, and
estimate the at least one indeterminate parameter from a relationship between the measurements of the different information sources, wherein the estimation is performed independent of the filter vector.

* * * * *